United States Patent
Grant-Acquah et al.

(10) Patent No.: US 6,779,801 B2
(45) Date of Patent: Aug. 24, 2004

(54) ANTI-FRET PRIMER FOR MULTILAYER GASKETS

(75) Inventors: Frank Grant-Acquah, Hanover, IL (US); Mike Kestly, Bolingbrook, IL (US); Frank Popielas, Naperville, IL (US)

(73) Assignee: Dana Corporation, Toledo, OH (US)

( * ) Notice: Subject to any disclaimer, the term of this patent is extended or adjusted under 35 U.S.C. 154(b) by 0 days.

(21) Appl. No.: 10/274,865

(22) Filed: Oct. 21, 2002

(65) Prior Publication Data

US 2004/0075219 A1 Apr. 22, 2004

(51) Int. Cl.⁷ .............................................. F02F 11/00
(52) U.S. Cl. ....................................................... 277/592
(58) Field of Search ........................................ 277/592

(56) References Cited

U.S. PATENT DOCUMENTS

| | | | | |
|---|---|---|---|---|
| 2,957,784 A | * | 10/1960 | Schiefelbein | ................ 428/472 |
| 4,338,376 A | * | 7/1982 | Kritzler | ..................... 428/417 |
| 4,448,847 A | * | 5/1984 | Bell et al. | .................... 428/413 |
| 4,849,295 A | * | 7/1989 | Dickerman et al. | ......... 428/457 |
| 4,962,136 A | * | 10/1990 | Peters | ........................ 523/220 |
| 5,122,214 A | * | 6/1992 | Zurfluh et al. | .............. 156/220 |
| 5,277,434 A | * | 1/1994 | Kestly et al. | ................ 277/592 |
| 5,322,299 A | * | 6/1994 | Terai | ........................... 277/596 |
| 5,368,315 A | * | 11/1994 | Viksne | ....................... 277/592 |
| 5,491,031 A | * | 2/1996 | Seibel | ......................... 428/458 |
| 5,582,415 A | | 12/1996 | Yoshida et al. | |
| 5,984,317 A | * | 11/1999 | Grant-Acquah et al. | .... 277/592 |
| 6,090,869 A | * | 7/2000 | Orkin et al. | ................ 523/433 |
| 6,145,847 A | | 11/2000 | Maeda et al. | |
| 6,284,322 B1 | * | 9/2001 | Nazaryan et al. | ........... 427/386 |
| 6,299,175 B1 | | 10/2001 | Mackawa et al. | |
| 6,319,973 B1 | * | 11/2001 | Lemm et al. | ............... 524/404 |
| 6,607,830 B2 | * | 8/2003 | Murakami et al. | .......... 428/422 |

* cited by examiner

*Primary Examiner*—Alison Pickard
(74) *Attorney, Agent, or Firm*—Rader, Fishman & Grauer, PLLC

(57) ABSTRACT

The present invention relates to an improved primer coating for a multilayer gasket. The coating includes an elastomer, an epoxy resin and a particulate lubricant. The coating may also employ other components such as cure accelerators and reactive diluents. Also disclosed is a method of making the primer coating.

15 Claims, 1 Drawing Sheet

ANTI-FRET PRIMER FOR MULTILAYER GASKETS

FIELD OF THE INVENTION

This invention generally relates to improved multi-layer steel gaskets. More specifically the present invention relates to an improved anti-fret primer coating for a multilayer gasket.

BACKGROUND OF THE INVENTION

Gaskets are used in a variety of locations in an internal combustion engines. The primary requirement of these gaskets is that they be able to maintain sealing capabilities at the operating temperatures of the engine for suitably long operational life. Known gaskets are typically made with rubber sealing layers applied to a metal layer in such a manner that the resultant gasket has alternating rubber and metal layers. One challenge faced by use of gaskets is wear.

Indeed, wear will often be the limiting factor in the operational life of a multilayer gasket. Typically, wear will eventually compromised the ability of the gasket to maintain a seal. The seal may be compromised by the break down of the metal layers caused by wear or abrasion of the metal layers against the engine parts. The vibrations/thermal expansion motions inherently present in an engine are the source of the abrasion. The abrasion eventually leads to cracking or fretting of the metal layers.

The seal may also be compromised by the delamination of the rubber sealing layers from the metal layers. Delamination results from the combination of poor adhesion between the metal and rubber layers and the motions of the engine. Forestalling fretting for as long as possible will increase the service life of the gasket. Currently, primers are only used to enhance adhesion and do not provide sufficient resistance to fretting.

The inventors have recognized a need for an improved primer that provides good adhesion with anti-fret benefits

SUMMARY

The present invention relates to an improved primer coating for a multilayer gasket. The coating includes an elastomer, an epoxy resin and a particulate lubricant. The coating may also employ other components such as cure accelerators and reactive diluents. Also disclosed is a method of making the primer coating.

DETAILED DESCRIPTION

Figure 1:
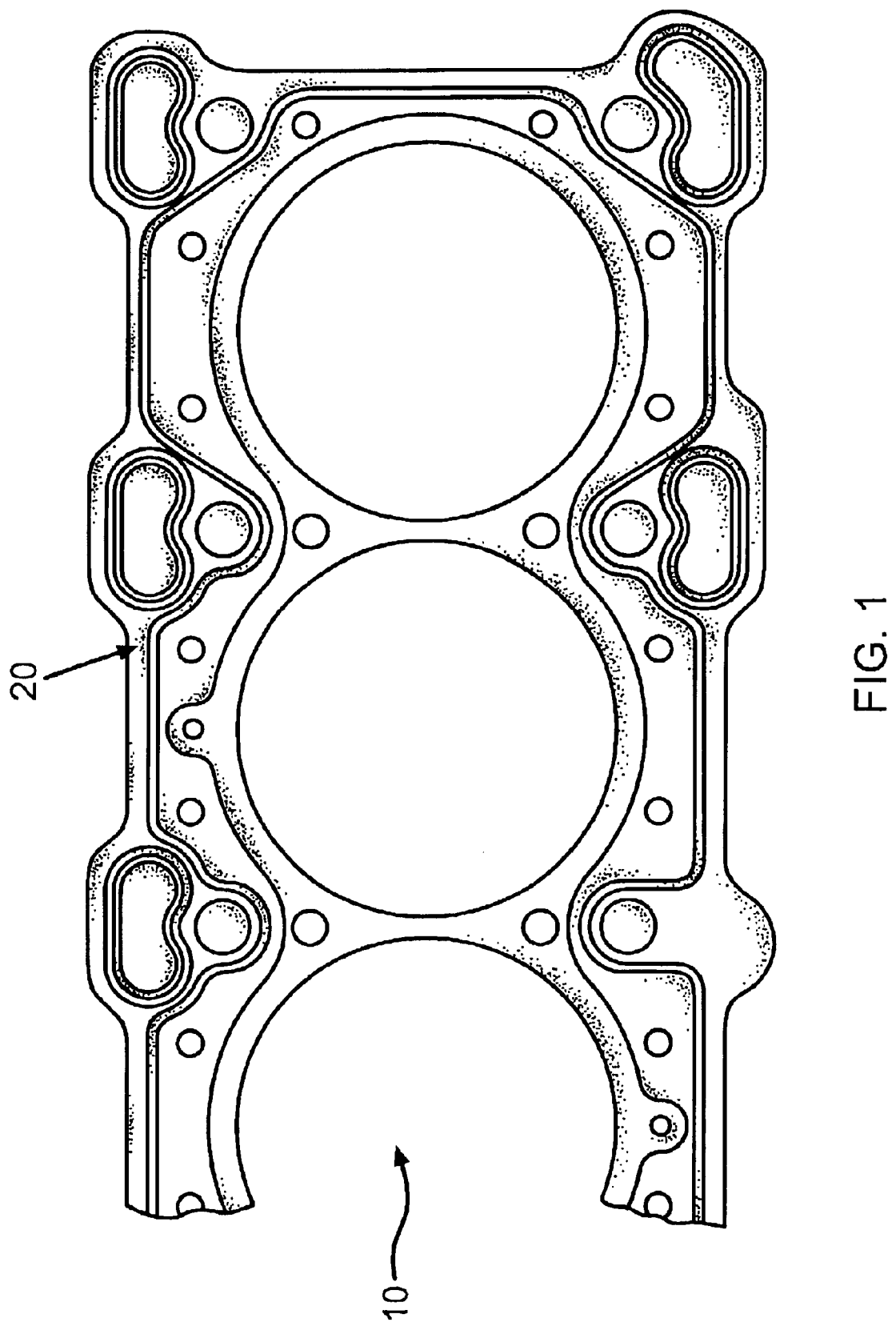
FIG. 1 shows a plan view of one metal layer to which a primer of the present invention may be applied.

As seen in FIG. 1, a metal layer 10 of a gasket may be coated with a primer 20 of the present invention. Several metal layers may be assembled into a multilayer gasket where rubber sealing layers separate and seal the metal layers. The inventive primer provides a fret resistant coating that also advantageously inhibits delamination of the rubber layer. The primer provides a barrier between the gasket metal layers and the engine hardware, reducing fretting and subsequent metal layer fatigue damage. Furthermore, the primer provides improved adhesion between the metal and rubber layers of the gasket to decrease the likelihood of delamination. These properties are present even at the elevated temperatures present in an operating engine.

The primer of the present invention includes an elastomer base, an epoxy resin, and a particulate lubricant. The elastomer base material gives the primer its elastic nature and also offers good adhesion to the rubber sealing layers and the epoxy resin. Preferred elastomers are fluoroelastomers because of their temperature resistance. Suitable fluoroelastomers include those available from Dupont and Ausimont and the Dyneon line from 3M. Typically, the elastomer is dissolved in a solvent before combination with other components, although this is not necessarily the case.

The epoxy resin will strongly adhere to the metal layers, while also being temperature resistant and durable. The combination of the elastomer and the epoxy resin creates a resilient, yet durable primer. Any epoxy resin is suitable, with those having high temperature resistance being preferred. Typically two part epoxy resins are used, although one part resins may also be suitable. In a two part epoxy resin, any hardener may be used such as aliphatic and aromatic primary amines, tertiary amine, acid anhydrides, amides and other acids. Multi-functional epoxy resins are suitable, such as those sold under the trade name Araldite™ from Vantico.

Other components may be used as part of the epoxy resin to affect its processing properties. For example, it is often desirable to use a cure accelerator to accelerate the curing process once a certain temperature is reached. Boron trifluoride is one suitable cure accelerator. Another epoxy component is a viscosity modifier, such as a reactive diluent from Vantico, which decreases the viscosity of the epoxy so that it may be more easily applied.

The lubricant is a particulate substance that is selected for its resistance to high temperatures as well as its abrasion resistance. Known materials such as metallic, organic and inorganic carbides, nitrides and silicides are suitable particulate lubricants, as is graphite. However, metallic sulfides, and molybdenum disulfide in particular, are preferred.

The preferred primer of the present invention has about 5–20 wt % of elastomer, about 35–55 wt % of epoxy resin and about 25–45 wt % of particulate lubricant, with ranges of about 10–15 wt % of elastomer, about 40–45 wt % of epoxy resin and about 30–40 wt % of particulate lubricant most preferred.

The primer coating is made by first thoroughly mixing the components of the epoxy together along with a solvent, such as dipropylene methyl ether acetate (DPMA). Other solvent can also be used. Generally, the mixing step is performed for lasts about 3–5 minutes. Next, the particulate lubricant is added to the epoxy composition and mixed for about 15 minutes. Lastly, the elastomer is added and the resultant composition is allowed to mix for about 30 minutes.

The primer coating may be applied to metal sheets by conventional methodologies such as roll coating, calendaring or spraying. Screen printing, however, is the preferred because it allows accurate placement of coating with a minimum of wasted materials. The primer can be made suitable for a given application method by adjusting the amount of solvent utilized. For example, a thicker composition, and thus less solvent, is desired for screen printing as compared to a thinner composition that may be used for spraying.

Once the primer coating is applied to the metal gasket layer, a rubber layer is then applied to the primed metal sheet. Any suitable rubber material may be used for the rubber layer, with materials that have improved adherence to the elastomer of the primer coating. Indeed, the same elastomer used in the primer is also preferably used in the rubber layer. This is because generally elastomers have good self-adherence properties. Thus, a preferred material is fluoroelastomer. After application of the rubber layer, the metal sheet may be stamped and beaded into desired shapes. Because of the primer, the rubber layer will not delaminate or otherwise be damaged by stamping and beading. The stamped and/or beaded layers may then be assembled in a multilayer gasket.

WORKING EXAMPLE

Table 1 shows the components of an example of a preferred embodiment of the primer.

TABLE 1

| Component | Provider | Type | Amount |
|---|---|---|---|
| Araldite ® LY 5056 | Vantico | epoxy resin | 15.5 wt % |
| Araldite ® HY 5200 | Vantico | epoxy hardener | 9.4 wt % |
| Araldite ® RD2 | Vantico | epoxy reactive diluent | 17.8 wt % |
| Anchor ® 1115 | Air Products | epoxy cure accelerator | 0.7 wt % |
| DPMA | Chemcentral | solvent | 8.9 wt % |
| Molybdenum Disulfide | Climax Molybdenum Marketing | particulate lubricant | 35.6 wt % |
| Dyneon FC 2230 (40–45% solids in DPMA) | 3M | fluoroelastomer | 12.1 wt % |

The Araldite LY 5056 epoxy resin, Araldite HY 5200 epoxy hardener, Araldite RD2 reactive diluent and Anchor 1115 cure accelerator are added together with the DPMA solvent and mixed for about 3–5 minutes with a propeller. Next, the molybdenum disulfide is added, and the composition is further mixed for about 15 minutes. Lastly, the solution of Dyneon FC 2230 in DPMA is added. The entire mixture is mixed for an additional 30 minutes or so. The resultant composition contains about 12.1 wt % elastomer, about 43.4 wt % epoxy resin and about 35.6 wt % particulate lubricant.

After thorough mixing, the primer is screen printed onto a cleaned sheet of metal. The solvent in the primer is driven off by heating the metal sheet to 230–260° F. for about 3–5 minutes. Next, the rubber layer is created by applying a solution of Dyneon FC 2230 in DPMA to the primed metal sheet. The solvent is again driven off by heating to 230–260° F. for another about 3–5 minutes. The sheets are next given a post cure by heating to 350–400° F. for about 15–30 minutes. After the sheets are post-cured, the sheet may be stamped and beaded as desired and assembled with other metal layers into a multilayer gasket.

In operation, a gasket of the present invention is placed where a seal is needed. Typically, the seal is needed where two components meet, e.g. the engine block and the cylinder head. The gasket is placed and the components are fastened together, thus creating the seal.

While the invention has been specifically described in connection with certain specific embodiments thereof, it is to be understood that this is by way of illustration and not of limitation, and the scope of the appended claims should be construed as broadly as the prior art will permit.

What is claimed is:

1. A gasket, comprising:

at least one metal layer coated with a primer and at least one rubber layer applied over the primer, wherein the primer includes an elastomer, an epoxy resin and a particulate lubricant; and wherein the primer includes about 10–15 wt % of the elastomer, about 40–45 wt % of the epoxy resin, and about 30–40 wt % of the particulate lubricant.

2. The gasket or claim 1, wherein the primer includes a fluoroelastomer.

3. The gasket of claim 1, wherein the primer includes molybdenum disulfide.

4. The gasket of claim 1, further comprising a plurality of metal layers alternating with a plurality of a rubber layers.

5. The gasket of claim 4, wherein the rubber layers include a fluoroelastomer.

6. The gasket of claim 1, wherein the epoxy resin includes a cure accelerator.

7. The gasket of claim 1, wherein the epoxy resin includes a reactive diluent.

8. A gasket, comprising:

a plurality of metal layers each coated with a primer; and a plurality of rubber layers wherein each rubber layer separates one metal layer from another metal layer, wherein the primer includes about 10–15 wt % of an elastomer, about 40 –45 wt % of an epoxy resin, and about 30–40 wt % of a particulate lubricant.

9. The gasket of claim 8, wherein the elastomer is a fluoroelastomer.

10. The gasket of claim 8, wherein the epoxy resin includes a cure accelerator and a reactive diluent.

11. The gasket of claim 8, wherein the particulate lubricant is molybdenum disulfide.

12. A method of making a primer for a metal layer for a gasket, comprising:

mixing an epoxy resin with a solvent;

mixing a particulate lubricant into the mixed epoxy resin; and mixing an elastomer into the resultant mixture to form a primer, wherein the primer includes about 10–15 wt % of an elastomer, about 40–45 wt % of an epoxy resin, and about 30–40 wt % of a particulate lubricant.

13. The method of claim 12, wherein the elastomer is a fluoroelastomer.

14. The method of claim 12, wherein the epoxy resin includes an epoxy hardener, a cure accelerator and a reactive diluent.

15. The method of claim 12, wherein the particulate lubricant is molybdenum disulfide.

* * * * *

UNITED STATES PATENT AND TRADEMARK OFFICE
CERTIFICATE OF CORRECTION

PATENT NO.    : 6,779,801 B2
DATED         : August 24, 2004
INVENTOR(S)   : Frank Grant-Acquah, Mike Kestly and Frank Popielas It is certified that error appears in the above-identified patent and that said Letters Patent is hereby corrected as shown below:

Column 4,
Line 15, replace "or" with -- of --;
Line 19, after the words "a plurality of" delete "a".

Signed and Sealed this

Eighth Day of February, 2005

JON W. DUDAS
*Director of the United States Patent and Trademark Office*